US011628702B2

(12) United States Patent
Cho et al.

(10) Patent No.: US 11,628,702 B2
(45) Date of Patent: Apr. 18, 2023

(54) SUSPENSION SYSTEM FOR VEHICLE (71) Applicants: Hyundai Motor Company, Seoul (KR); Kia Corporation, Seoul (KR)

(72) Inventors: Jae Hyun Cho, Incheon (KR); Sang Min Lee, Seoul (KR); Sang Hoon Yoo, Chungcheongnam-do (KR); Hae Seong Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/533,791

(22) Filed: Nov. 23, 2021

(65) Prior Publication Data
US 2022/0288989 A1   Sep. 15, 2022

(30) Foreign Application Priority Data

Mar. 11, 2021   (KR) .................... 10-2021-0032256

(51) Int. Cl.
*B60G 11/16*   (2006.01)
(52) U.S. Cl.
CPC ........ *B60G 11/16* (2013.01); *B60G 2200/142* (2013.01); *B60G 2202/12* (2013.01); *B60G 2204/1244* (2013.01)
(58) Field of Classification Search
CPC .............. B60G 11/16; B60G 2200/142; B60G 2202/12; B60G 2204/1244; B60G 15/067; B60G 11/52; B60G 2204/124
See application file for complete search history.

(56) References Cited

U.S. PATENT DOCUMENTS 8,061,690 B2 *  11/2011  Desprez ................. B60G 11/16
                                                      267/152
2006/0175776 A1 *  8/2006  Christophel .............. F16F 1/12
                                                      280/124.179
(Continued)

FOREIGN PATENT DOCUMENTS

DE   102012213905 A1 *  5/2014  ............. B60G 11/16
KR   2008-0052760 A        6/2008
(Continued)

OTHER PUBLICATIONS

Machine Translation of KR20170092347 (Year: 2017).*
European Search Report dated May 18, 2022 in European Patent Application No. 21209289.4.

*Primary Examiner* — Paul N Dickson
*Assistant Examiner* — Kurtis Nielson
(74) *Attorney, Agent, or Firm* — Fox Rothschild LLP (57) ABSTRACT

A suspension system for a vehicle includes a spring pad coupled to a spring and configured to support the spring connecting a suspension arm and a vehicle body member of the vehicle, where the spring pad includes: a seat part coupled to an end of the spring; a guide part configured to guide upward and downward movements of the seat part; and an elastic part configured to connect the seat part and the guide part and having a length that varies when the seat part moves. In particular, the spring is consistently supported by being coupled to the seat part of the spring pad even in a situation in which an additional rebound further occurs in a full-rebound situation and the spring deviates from a range in which the spring can be extended, thus preventing withdrawal of the spring connecting the suspension arm and the vehicle body member.

11 Claims, 11 Drawing Sheets (56) References Cited

U.S. PATENT DOCUMENTS

| | | | |
|---|---|---|---|
| 2007/0013161 | A1 | 1/2007 | Rhein |
| 2007/0194507 | A1 | 8/2007 | Kato et al. |
| 2016/0016342 | A1* | 1/2016 | Al-Dahhan ....... B29C 45/14311 |
| | | | 264/162 |
| 2016/0121674 | A1* | 5/2016 | Cha ........................ B60G 11/16 |
| | | | 280/124.151 |
| 2018/0111436 | A1 | 4/2018 | Love |
| 2018/0272821 | A1* | 9/2018 | Meier ..................... F16F 1/122 |
| 2020/0248742 | A1* | 8/2020 | Yamada .................... F16F 9/38 |
| 2021/0129611 | A1* | 5/2021 | Kirsch ................... F16F 1/041 |

FOREIGN PATENT DOCUMENTS

| | | | |
|---|---|---|---|
| KR | 10-2017-0092347 A | | 8/2017 |
| KR | 20170092347 A | * | 8/2017 |

* cited by examiner

SUSPENSION SYSTEM FOR VEHICLE

CROSS REFERENCE TO RELATED APPLICATION

The present application claims under 35 U.S.C. § 119(a) the benefit of Korean Patent Application No. 10-2021-0032256, filed Mar. 11, 2021, the entire contents of which are incorporated by reference herein.

BACKGROUND

(a) Technical Field

The present disclosure relates to a suspension system for a vehicle, more particularly, to the suspension system having a configuration capable of preventing withdrawal of a spring for connecting a suspension arm and a vehicle body member even though a rebound situation additionally occurs during a full-rebound situation while the vehicle is in motion.

(b) Description of the Related Art

Recently, a trend in tuning an engine or vehicle is to gradually increase "hard" properties of the vehicle so as to replicate handling performance of high-end European vehicles. In addition, the vehicle should have a reduced weight in order to conform with environmental regulations, e.g., to improve fuel efficiency.

In order to implement the vehicle having the hard property, rigidity (i.e., a wheel rate) that is generated when a tire receives a vertical load needs to be high, and rigidity of a spring connecting a suspension arm and a vehicle body member needs to be increased to increase the wheel rate.

Further, when a load of the vehicle is decreased, a force for compressing the spring is decreased, and as a result, a compression amount of the spring is decreased.

The compression amount of the spring is further decreased when the tire receives the vertical load in a case in which the load of the vehicle is decreased to satisfy the environmental regulations in a state in which the rigidity of the spring is increased to satisfy the hard property of the vehicle as described above. For this reason, there is a drawback in that the spring connecting the suspension arm and the vehicle body member is withdrawn in a case in which a rebound situation additionally occurs in a full-rebound situation while the vehicle travels (a situation in which the spring deviates from a range in which the spring can be extended, or a situation in which the spring deviates from a free height of the spring, that is, a situation in which the tire passes a deep puddle). As a result, there is a problem in that an accident such as a rollover of the vehicle may occur.

A wheel stroke of the vehicle needs to be decreased in order to prevent the withdrawal of the spring. However, because the wheel stroke of the vehicle is a main factor that affects performance and marketability of the vehicle, it is not easy to change the wheel stroke.

The foregoing explained as the background is intended merely to aid in the understanding of the background of the present disclosure, and is not intended to mean that the present disclosure falls within the purview of the related art that is already known to those skilled in the art.

SUMMARY

The present disclosure provides a suspension system for a vehicle, which has a configuration capable of preventing withdrawal of a spring connecting a suspension arm and a vehicle body member even in a case in which a rebound situation additionally occurs in a full-rebound situation while the vehicle travels, that is, even in a situation in which the spring deviates from a range (a free height of the spring) in which the spring can be extended, thereby improving stability of the vehicle.

In one aspect, the present disclosure provides a suspension system for a vehicle, the suspension system including: a spring pad coupled to a spring and configured to support the spring connecting a suspension arm and a vehicle body member of the vehicle, in which the spring pad includes: a seat part coupled to an end of the spring; a guide part configured to guide upward and downward movements of the seat part; and an elastic part configured to connect the seat part and the guide part and having a length that varies when the seat part moves.

A spring coupling groove may be formed along an outer circumference of the seat part, and the spring may be inserted and fixed into the spring coupling groove.

The seat part may be made of a rubber material to absorb impact and prevent noise.

The seat part may be made of a rubber material, and an inner steel member made of a steel material may be coupled in the seat part to maintain a shape of the seat part.

An outer circumferential surface of the guide part may be provided as an inclined surface to prevent interference with the seat part when the seat part moves.

The guide part may be made of any one of engineered plastic or steel to maintain strength.

The elastic part may be compressed by an elastic force of the spring coupled to the seat part in an empty vehicle state or in the event of a bump, and in a normal full-rebound situation in which the spring does not deviate from a free height of the spring or when an additional rebound further occurs in the full-rebound situation, the elastic part may be decompressed and elastically deformed so that the length thereof increases, such that the spring is prevented from being withdrawn from the spring pad.

The elastic part may be made of any one of a polyurethane material or a highly compressive polymer material.

The elastic part may have an external shape formed in any one of a cylindrical shape or a bellows shape.

The guide part of the spring pad may be fixed to the vehicle body member positioned above the suspension arm, and an upper end of the spring may be coupled to the seat part of the spring pad.

The guide part of the spring pad may be fixed to the suspension arm, and a lower end of the spring may be coupled to the seat part of the spring pad.

The guide parts of the spring pads may be fixed to the suspension arm and the vehicle body member positioned above the suspension arm, respectively, an upper end of the spring may be coupled to the seat part of the spring pad fixed to the vehicle body member, and a lower end of the spring may be coupled to the seat part of the spring pad fixed to the suspension arm.

According to the suspension system according to the present disclosure, the spring is consistently supported by being coupled to the seat part of the spring pad even in the situation in which the additional rebound further occurs in the full-rebound situation and the spring deviates from the range (the free height of the spring) in which the spring can be extended. As a result, the spring pad may prevent the withdrawal of the spring connecting the suspension arm and the vehicle body member, thereby preventing occurrence of a safety accident such as a rollover of the vehicle, and thus improving marketability by improving stability of the vehicle.

In addition, the embodiment according to the present disclosure is configured to prevent the withdrawal of the rear wheel spring in the event of the full-rebound of the vehicle having a high wheel rate like a tuned and high-performance vehicle of which the handling is preferentially considered. As a result, it is possible to ensure an additional rebound stroke, and in particular, it is possible to ensure excellent ride quality by improving impact shock even in the case of the high-performance vehicle.

In addition, the present disclosure provides the configuration in which the lower end of the spring is physically supported by the spring pad at a point in time at which the vehicle reaches the full rebound, such that the withdrawal of the spring may be prevented. As a result, the structure does not affect rigidity of the spring while the vehicle travels, and thus the structure may be applied without heterogeneity.

DETAILED DESCRIPTION OF THE DISCLOSURE

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions of embodiments of the present disclosure disclosed in this specification or application are exemplified only for the purpose of explaining the embodiments according to the present disclosure, the embodiments according to the present disclosure may be carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular exemplary embodiments and are not intended to limit the present disclosure. Singular expressions include plural expressions unless clearly described as different meanings in the context.

Unless otherwise defined, all terms used herein, including technical or scientific terms, have the same meaning as commonly understood by those skilled in the art to which the present disclosure pertains. The terms such as those defined in a commonly used dictionary should be interpreted as having meanings consistent with meanings in the context of related technologies and should not be interpreted as ideal or excessively formal meanings unless explicitly defined in the present specification.

A control unit (controller) according to an exemplary embodiment of the present disclosure may be implemented by a non-volatile memory (not illustrated) configured to algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, a suspension system for a vehicle according to an exemplary embodiment of the present disclosure will be described with reference to the accompanying drawings.

FIGS. 1 to 11 illustrate an example of a multi-link type rear wheel suspension system for explaining the present disclosure.

The suspension system for a vehicle according to the present disclosure is configured such that one end of a suspension arm 10 is connected to a vehicle body frame 20, and the other end of the suspension arm 10 is connected to a knuckle 40 of a tire 30.

The suspension arm 10 preferably is a rear wheel lower arm, and the vehicle body frame 20 preferably is a rear wheel cross member.

A suspension arm bushing is coupled to one end of the suspension arm 10, and a bolt 50 penetrates the suspension arm bushing and the vehicle body frame 20 and is fastened to a nut, such that one end of the suspension arm 10 is coupled to the vehicle body frame 20.

The other end of the suspension arm 10 is coupled to the knuckle 40.

As illustrated in FIGS. 1 to 8, a first embodiment according to the present disclosure includes: a spring pad 70 fixedly coupled to a vehicle body member 60 positioned above the suspension arm 10; and a spring 80 having a lower end supported on the suspension arm 10, and an upper end coupled to and supported on the spring pad 70 fixed to the vehicle body member 60.

The vehicle body member 60 is a side member, and the spring 80 is a coil spring that connects the suspension arm 10 and the vehicle body member 60 through the spring pad 70.

The spring pad 70 according to the present disclosure includes a seat part 71 coupled to an end of the spring 80, a guide part 72 configured to guide upward and downward movements of the seat part 71, and an elastic part 73 configured to connect the seat part 71 and the guide part 72 and having a length that varies when the seat part 71 moves in an upward/downward direction.

A spring coupling groove 71a is formed along an outer circumference of the seat part 71, and the upper end of the spring 80 is inserted and fixed into the spring coupling groove 71a by being wound around the spring coupling groove 71a.

The seat part 71 may be made of a rubber material or an elastic material in order to prevent impact, noise, and chipping that occur due to contact between steel members, but the present disclosure is not limited thereto.

An inner steel member 74 made of a steel material for maintaining a shape of the seat part 71 is coupled in the seat part 71 made of rubber.

An outer circumferential surface of the guide part 72 is provided as an inclined surface 72a in order to prevent interference with the seat part 71 when the seat part 71 moves in the upward/downward direction.

The spring 80 is compressed and extended in the event of a bump and a rebound, and the seat part 71 coupled to the spring 80 needs to smoothly move upward and downward along the guide part 72 when the spring 80 is compressed and extended.

To this end, the inclined surface 72a is provided along an outer periphery of the guide part 72 on which the seat part 71 is installed, such that it is possible to prevent jamming caused by interference with the seat part 71 when the seat part 71 moves, thereby enabling smooth bump and rebound operations.

The first embodiment according to the present disclosure provides the structure in which the guide part 72 of the spring pad 70 is fixedly coupled to the vehicle body member 60 positioned above the suspension arm 10, and the upper end of the spring 80 is coupled to the seat part 71 of the spring pad 70. Therefore, the guide part 72 may be made of any one of engineered plastic or steel in order to ensure and maintain strength, but the present disclosure is not limited thereto.

The guide part 72 may be formed in a truncated conical shape having the inclined surface 72a formed along the outer circumference thereof.

The spring 80 is compressed and extended in the event of a bump and a rebound, the seat part 71 coupled to the spring 80 moves upward and downward along the guide part 72 when the spring 80 is compressed and extended, and the elastic part 73 needs to always connect the seat part 71 and the guide part 72 even when the seat part 71 moves upward and downward. To this end, the length of the elastic part 73 needs to vary in the upward/downward direction in the event of a bump and a rebound.

The elastic part 73 may be made of any one of a polyurethane material or a highly compressive polymer material having elasticity so that the length of the elastic part 73 may vary, but the present disclosure is not limited thereto.

Figure 9:
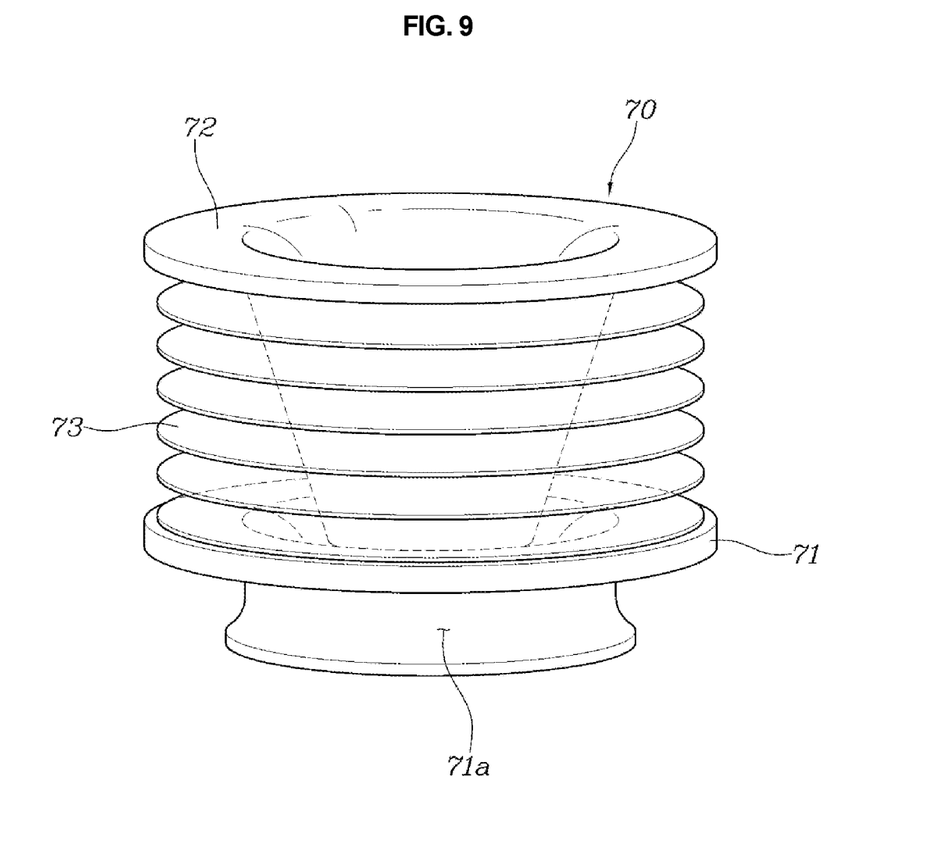
FIG. 9 is a view illustrating an embodiment in which an elastic part of the spring pad according to the present disclosure is provided in the form of a bellows.

The elastic part 73 may be formed to have an external shape formed in any one of a general cylindrical shape having a variable length or a bellows shape as illustrated in FIG. 9. A spring constant and a length variable in the upward/downward direction may be tuned by changing a cross-sectional area and a shape.

Figure 1:
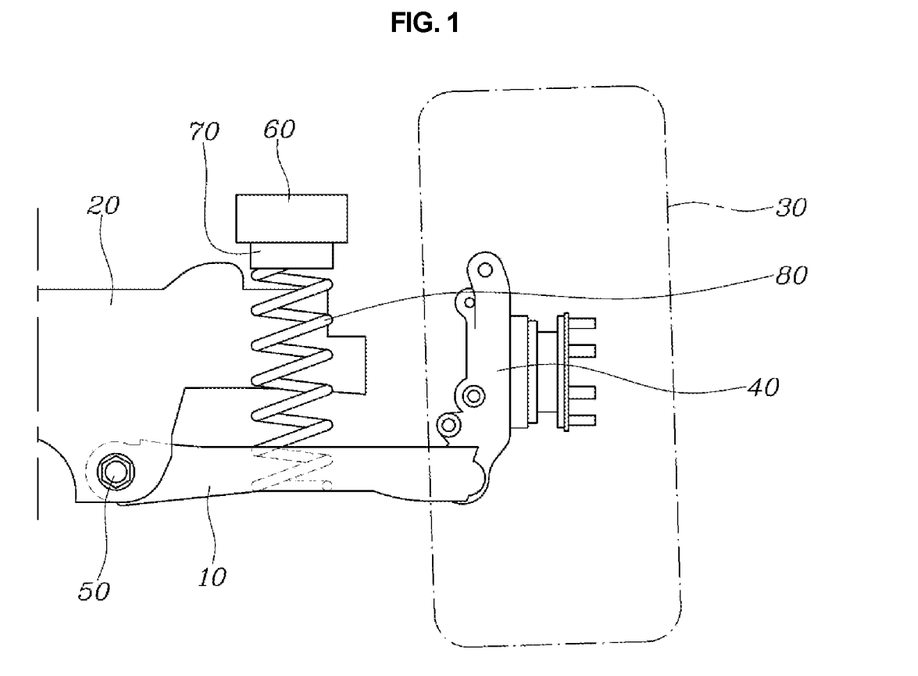
FIG. 1 is a view illustrating a suspension system for a vehicle according to the present disclosure in which a spring pad is coupled to a vehicle body member in an empty vehicle state.
Figure 2:
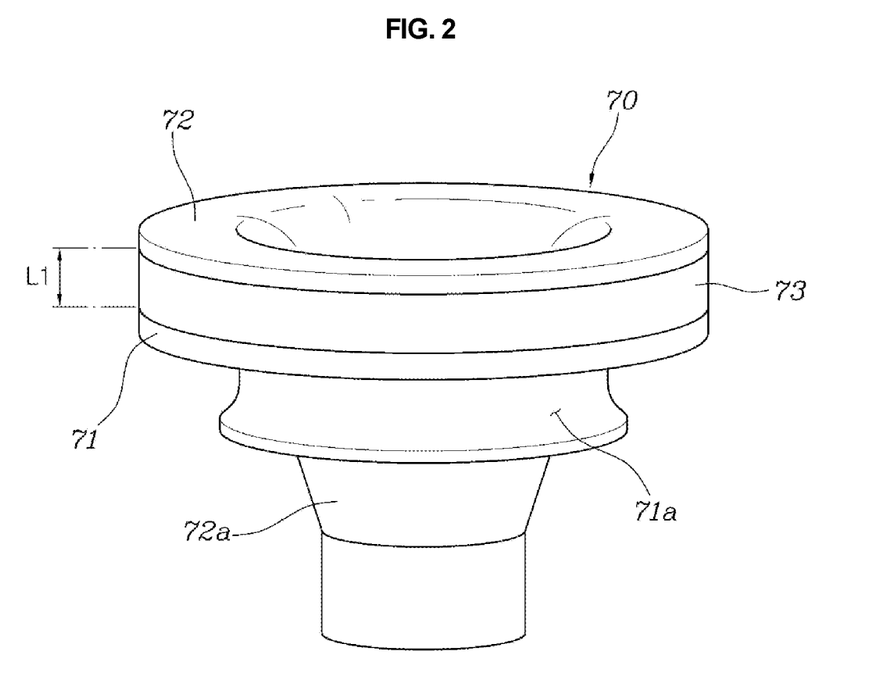
FIG. 2 is a perspective view of the spring pad illustrated in FIG. 1.
Figure 3:
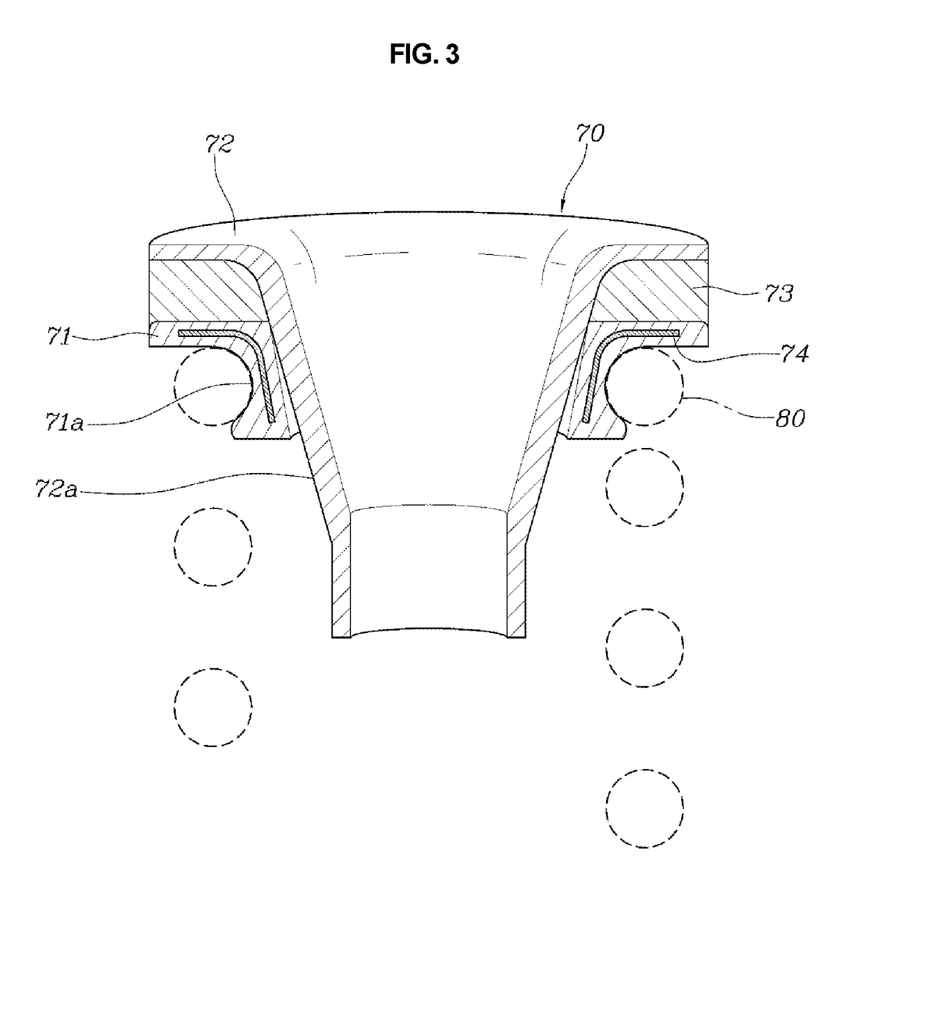
FIG. 3 is a cross-sectional view of FIG. 2.

FIG. 1 illustrates an empty vehicle state, and FIGS. 2 and 3 illustrate states of the spring pad 70 in the empty vehicle state.

In the empty vehicle state, the spring 80 is in a normal state without deviating from a free height of the spring, such that the elastic part 73 of the spring pad 70 is kept compressed by an elastic force of the spring 80 coupled to the seat part 71. In this case, the upper end of the spring 80 is kept supported by the seat part 71 by being coupled to the seat part 71.

When a bump occurs in the empty vehicle state illustrated in FIG. 1, the suspension arm 10 rotates about the bolt 50 counterclockwise in the illustrated state, the tire 30 moves upward, and the spring 80 is further compressed than in the state illustrated in FIG. 1.

Therefore, even in a normal full-bump situation in which the spring does not deviate from the free height of the spring, the upper end of the spring 80 is kept supported by the seat part 71 by being coupled to the seat part 71.

Figure 4:
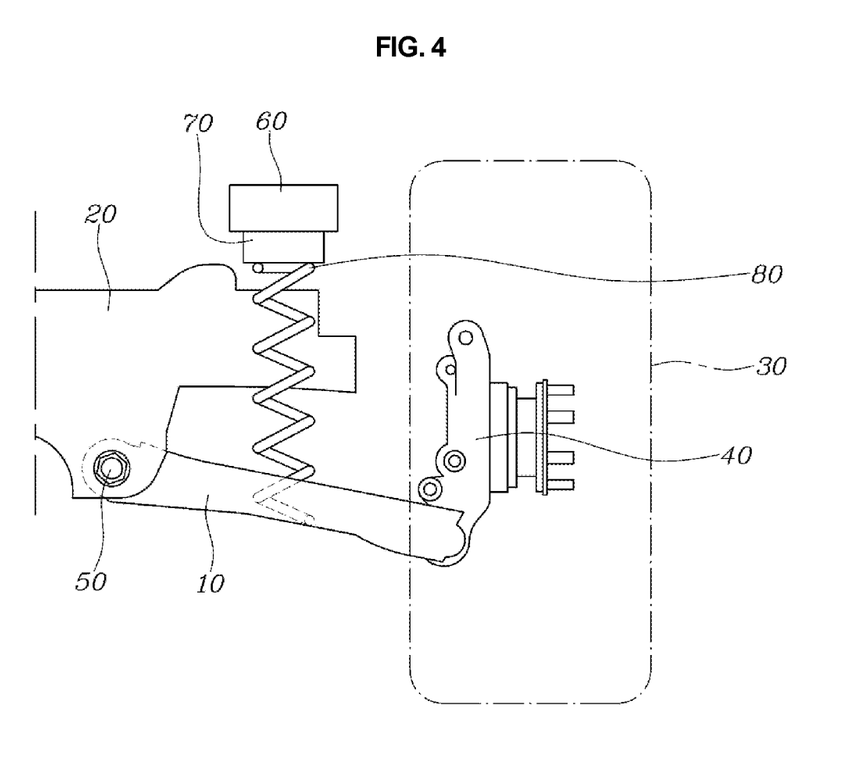
FIG. 4 is a view illustrating a full-rebound situation in the empty vehicle state illustrated in FIG. 1.
Figure 5:
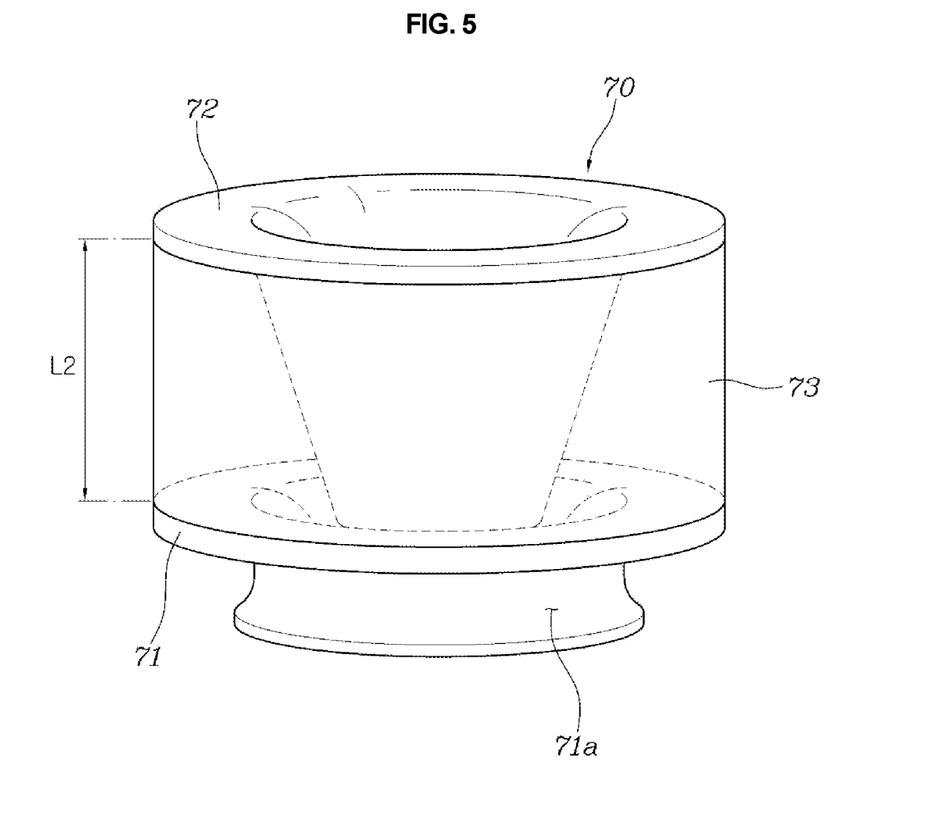
FIGS. 5 and 6 are a perspective view and a cross-sectional view, respectively, of the spring pad illustrated in FIG. 4.
Figure 6:
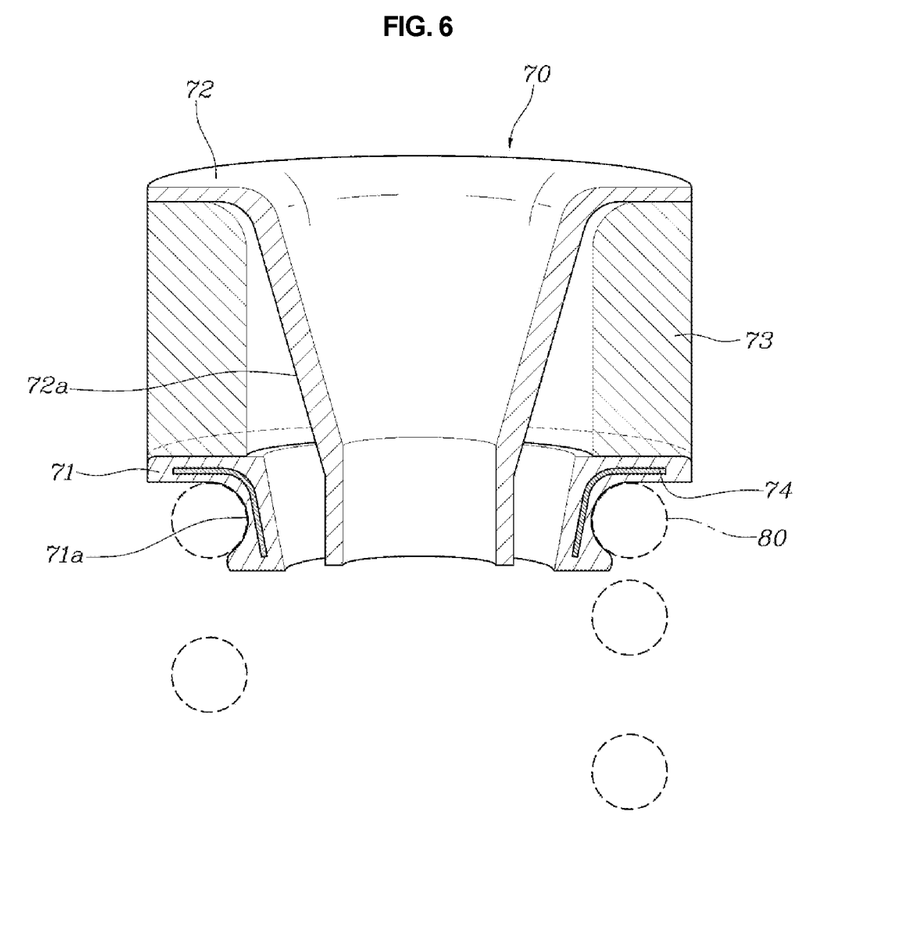

FIG. 4 illustrates a full-rebound state, and FIGS. 5 and 6 illustrate states of the spring pad 70 in the full-rebound situation.

In the event of a full-rebound in the empty vehicle state illustrated in FIG. 1, the suspension arm 10 rotates about the bolt 50 clockwise in the state illustrated in FIG. 1 and thus is positioned as illustrated in FIG. 4, the tire 30 moves downward, and the spring 80 is further extended than in the state illustrated in FIG. 1.

When the spring 80 is extended, the seat part 71 coupled to the spring 80 moves downward along the guide part 72, and a length L2 of the elastic part 73 connecting the seat part 71 and the guide part 72 is changed by the movement of the seat part 71 so as to be longer than a length L1 in the empty vehicle state illustrated in FIGS. 1 to 3.

In the full-rebound situation, the spring 80 is in the normal state in which the spring 80 does not deviate from the free height of the spring, and the upper end of the spring 80 is kept supported by the seat part 71 by being coupled to the seat part 71 even in the normal full-rebound situation.

Figure 7:
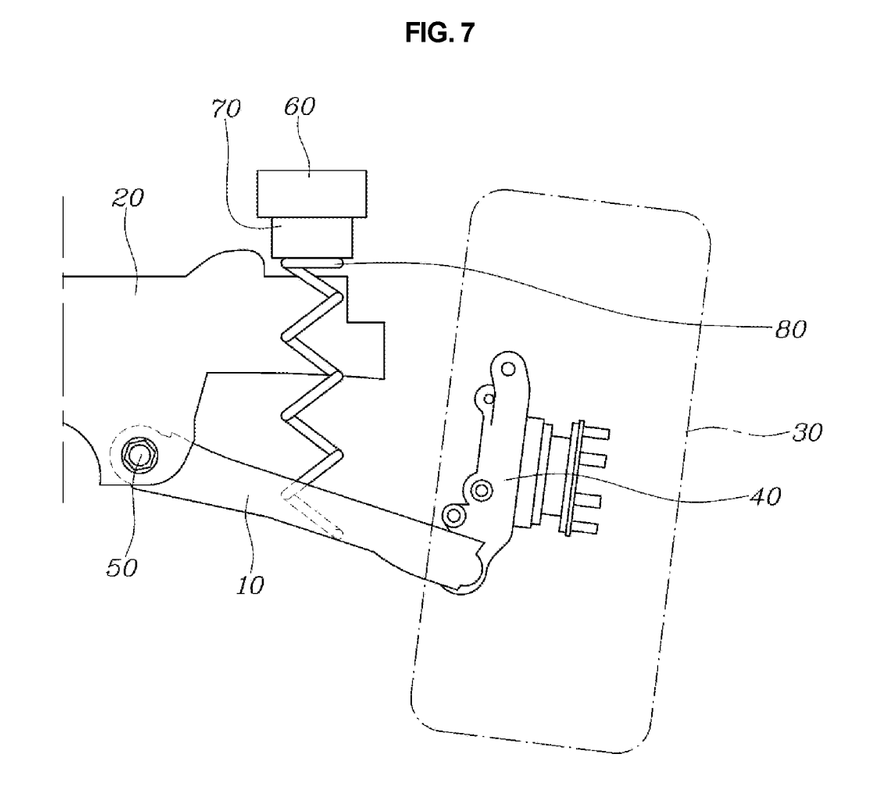
FIG. 7 is a view illustrating a state in which rebound additionally occurs in the full-rebound situation illustrated in FIG. 4.
Figure 8:
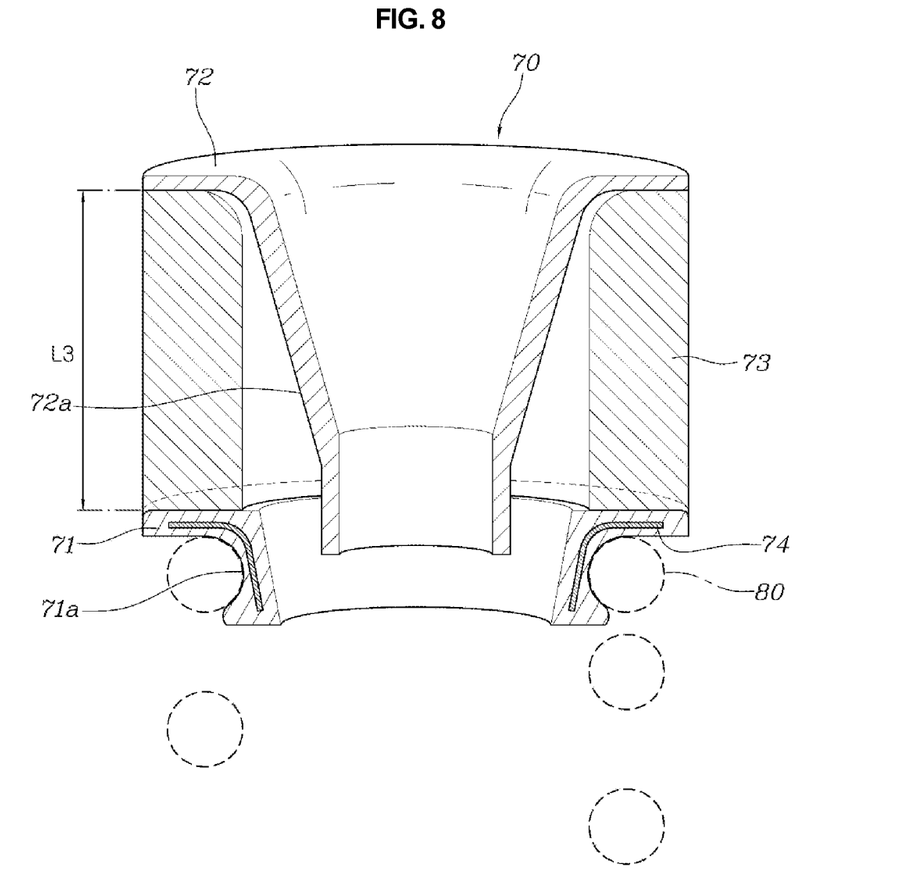
FIG. 8 is a cross-sectional view of the spring pad illustrated in FIG. 7.

FIG. 7 illustrates a state in which an additional rebound occurs in the full-rebound situation, and FIG. 8 illustrates a state of the spring pad 70 when the additional rebound occurs.

When the additional rebound further occurs in the full-rebound situation illustrated in FIG. 4, the suspension arm 10 further rotates about the bolt 50 clockwise in the state illustrated in FIG. 4 such that the amount of downward movement is further increased as illustrated in FIG. 4, the tire 30 further moves downward, and the spring 80 is further extended than in the state illustrated in FIG. 4.

The spring 80 is further extended than in the state illustrated in FIG. 4 and thus is positioned as illustrated in FIG. 7. In the case of a typical suspension system, the spring deviates from the free height of the spring, and the spring 80 is withdrawn and separated.

However, in the embodiment according to the present disclosure, a length L3 of the elastic part 73 connecting the seat part 71 and the guide part 72 is changed to be longer than the length L2 in the full-rebound situation illustrated in FIGS. 4 to 6 by the downward movement of the seat part 71 even though the additional rebound occurs in the full-rebound situation as illustrated in FIGS. 7 and 8. As a result, the upper end of the spring 80 is continuously kept supported by the seat part 71 by being coupled to the seat part 71, thereby preventing the withdrawal of the spring 80.

Figure 10:
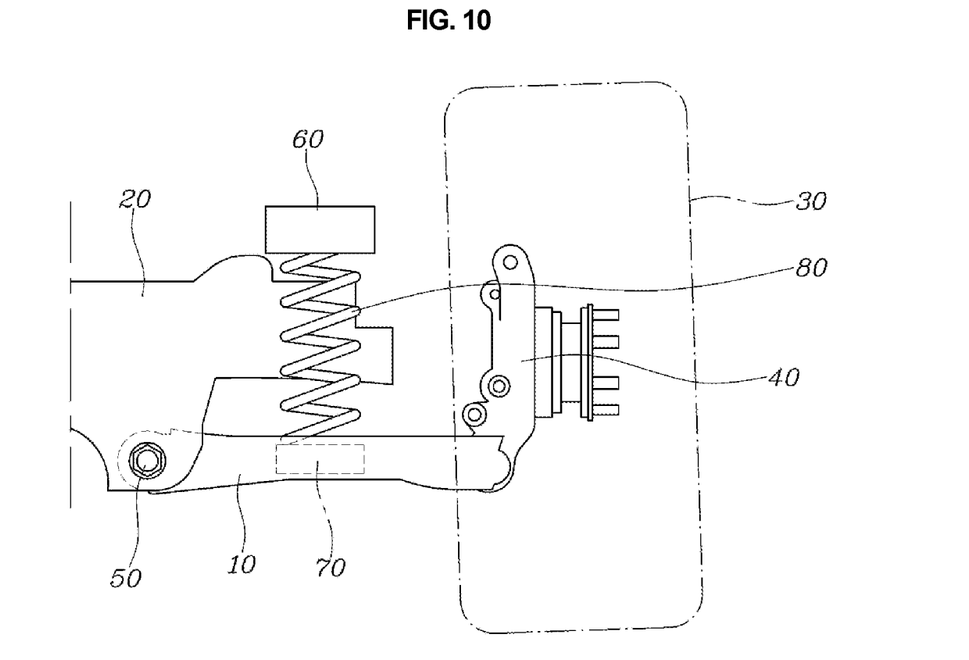
FIG. 10 is a view illustrating an embodiment in which the spring pad according to the present disclosure is installed on a suspension arm.

As illustrated in FIG. 10, a second embodiment according to the present disclosure may provide a structure in which the guide part 72 of the spring pad 70 is fixedly coupled to the suspension arm 10, the lower end of the spring 80 is coupled to the seat part 71 of the spring pad 70 fixed to the suspension arm 10, and the upper end of the spring 80 is supported by the vehicle body member 60 positioned above the suspension arm 10.

Figure 11:
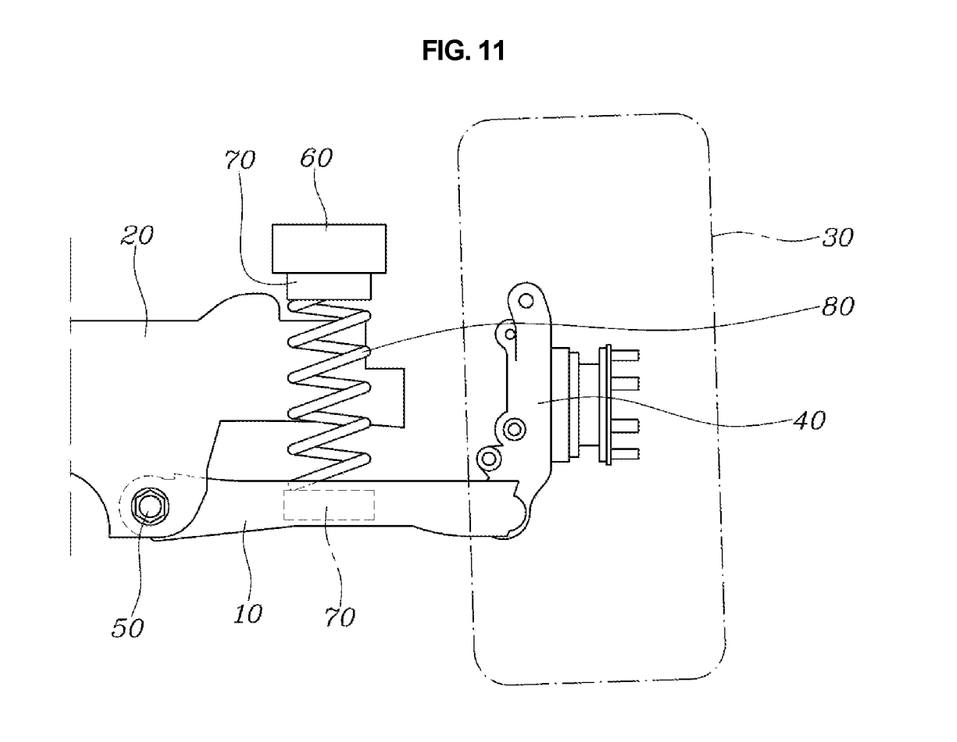
FIG. 11 is a view illustrating an embodiment in which the spring pad according to the present disclosure is installed on the suspension arm and the vehicle body member.

In addition, as illustrated in FIG. 11, a third embodiment according to the present disclosure may provide a structure in which the guide parts 72 of the spring pads 70 are fixedly coupled to the suspension arm 10 and the vehicle body member 60 positioned above the suspension arm 10, respectively, the upper end of the spring 80 is coupled to the seat part 71 of the spring pad 70 fixed to the vehicle body member 60, and the lower end of the spring 80 is coupled to and supported by the seat part 71 of the spring pad 70 fixed to the suspension arm 10.

In the embodiment according to the present disclosure as described above, the spring 80 is consistently supported by being coupled to the seat part 71 of the spring pad 70 even in the situation in which the additional rebound further occurs in the full-rebound situation and the spring 80 deviates from the range (the free height of the spring) in which the spring 80 can be extended. As a result, the spring pad 70 may prevent the withdrawal of the spring 80 connecting the suspension arm 10 and the vehicle body member 60, thereby preventing occurrence of an accident such as a rollover of the vehicle, and thus improving marketability by improving stability of the vehicle.

In addition, the embodiment according to the present disclosure is configured to prevent the withdrawal of the rear wheel spring in the event of the full-rebound of the vehicle having a high wheel rate like a tuned and high-performance vehicle of which the handling is preferentially considered. As a result, it is possible to ensure an additional rebound stroke, and in particular, it is possible to ensure excellent ride quality by improving impact shock even in the case of the high-performance vehicle.

In addition, the present disclosure provides the configuration in which the lower end of the spring 80 is physically supported by the spring pad 70 at a point in time at which the vehicle reaches the full rebound, such that the withdrawal of the spring 80 may be prevented. As a result, the structure does not affect rigidity of the spring while the vehicle travels, and thus the structure may be applied without heterogeneity.

While the specific exemplary embodiments of the present disclosure have been illustrated and described, it will be obvious to those skilled in the art that the present disclosure may be variously modified and changed without departing from the technical spirit of the present disclosure defined in the appended claims.

What is claimed is:

1. A suspension system for a vehicle, the suspension system comprising:
   a spring pad coupled to a spring and configured to support the spring connecting a suspension arm and a vehicle body member of the vehicle,
   wherein the spring pad comprises:
      a seat part coupled to an end of the spring;
      a guide part configured to guide upward and downward movements of the seat part; and
      an elastic part configured to connect the seat part and the guide part and having a length that varies when the seat part moves, wherein the elastic part has an external shape formed in a bellows shape.

2. The suspension system of claim 1, wherein a spring coupling groove is formed along an outer circumference of the seat part, and the spring is inserted and fixed into the spring coupling groove.

3. The suspension system of claim 1, wherein the seat part is made of a rubber material to absorb impact and prevent noise.

4. The suspension system of claim 1, wherein the seat part is made of a rubber material, and an inner steel member made of a steel material is coupled in the seat part to maintain a shape of the seat part.

5. The suspension system of claim 1, wherein an outer circumferential surface of the guide part is provided as an inclined surface to prevent interference with the seat part when the seat part moves.

6. The suspension system of claim 1, wherein the guide part is made of any one of engineered plastic or steel to maintain strength.

7. The suspension system of claim 1, wherein the elastic part is compressed by an elastic force of the spring coupled to the seat part in an empty vehicle state or in the event of a bump, and
wherein in a normal full-rebound situation in which the spring does not deviate from a free height of the spring or when an additional rebound further occurs in the full-rebound situation, the elastic part is decompressed and elastically deformed so that the length thereof increases, such that the spring is prevented from being withdrawn from the spring pad.

8. The suspension system of claim 1, wherein the elastic part is made of any one of a polyurethane material or a highly compressive polymer material.

9. The suspension system of claim 1, wherein the guide part of the spring pad is fixed to the vehicle body member positioned above the suspension arm, and an upper end of the spring is coupled to the seat part of the spring pad.

10. The suspension system of claim 1, wherein the guide part of the spring pad is fixed to the suspension arm, and a lower end of the spring is coupled to the seat part of the spring pad.

11. The suspension system of claim 1, wherein the spring pad further comprises a pair of spring pads and wherein the guide parts of the pair of spring pads are fixed to the suspension arm and the vehicle body member positioned above the suspension arm, respectively, an upper end of the spring is coupled to the seat part of the spring pad fixed to the vehicle body member, and a lower end of the spring is coupled to the seat part of the spring pad fixed to the suspension arm.

* * * * *